United States Patent Office 3,646,150
Patented Feb. 29, 1972

3,646,150
PREPARATION OF CYCLOBUTANONE BY CYCLO-
ADDITION OF ETHYLENE AND KETENE
Henry K. Hall, Jr., and Donald E. Plorde, Wilmington,
Del., assignors to E. I. du Pont de Nemours and Com-
pany, Wilmington, Del.
No Drawing. Filed Oct. 10, 1968, Ser. No. 766,623
Int. Cl. C07c 45/00
U.S. Cl. 260—586 R                                    1 Claim

ABSTRACT OF THE DISCLOSURE

Disclosed herein is a process of preparing cyclobutanone by the thermal cycloaddition of monomeric ketene and ethylene.

BACKGROUND OF THE INVENTION (1) Field of the invention

This invention relates to the preparation of cyclobutanone by the thermal cycloaddition of monomeric ethylene and ketene.

(2) Description of the prior art

Cyclobutanone is an old compound, but its preparation by the cycloaddition of ethylene and ketene, the subject of this invention, is heretofore unknown. Although activated ketenes, such as dimethyl ketene, are known to react with unactivated olefins such as ethylene [German Pat. 1,199,259, Aug. 26, 1965; Martin et al., J. Org. Chem. 30, 4175 (1965)], ketene itself is considered unreactive in such additions except with activated olefins such as 1,3-butadiene, cyclopentadiene and 1,3-cyclohexadiene. Further, ketene is unreactive even with such activated olefins unless heated (Martin et al., loc. sit.; Organic Reactions, volume 12, 1962, pages 1–56). It is most surprising, therefore, that the process of the present invention, comprising the cycloaddition of ketene and the unactivated olefin ethylene, can be successfully employed in the preparation of cyclobutanone.

SUMMARY AND DETAILS OF THE INVENTION

The present invention can be defined as the process of preparing cyclobutanone by reaction of monomeric ketene with ethylene. The reaction is illustrated as follows:

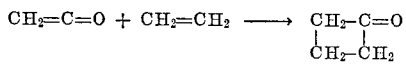

The reaction can be described as a thermal cycloaddition. Since monomeric ketene dimerizes readily under the conditions of the process, it is important to maintain a considerable excess of ethylene so that the cycloaddition can compete effectively with ketene dimerization.

The minimum practical ethylene to ketene mole ratio is estimated at about 50 to 1. Continuous addition of monomeric ketene to a supply of ethylene under reaction conditions at a rate nearly equivalent to the rate of cycloaddition is envisioned as a most efficient procedure for formation of cyclobutanone instead of ketene dimer.

The reaction takes place at a temperature of about 200° C. (± ca. 25°) under a pressure of about 1000 atm. (ethylene pressure), and the reaction time is best kept at 60 minutes or less.

EMBODIMENTS OF THE INVENTION

Further details of the process comprising the present invention will become apparent from the following non-limiting example.

EXAMPLE

Ketene was purified by two trap-to-trap distillations saving only the middle 80% in each distillation, and 5 g. so purified were condensed into an evacuated constricted glass vial. The vial was sealed while evacuated and was kept cool in Dry Ice-acetone until used; it was then wiped dry and placed in a 400 ml. stainless steel shaker tube. This tube was closed and freed to air and moisture by alternate evacuation and nitrogen flush cycles (five cycles ending with evacuation). The tube was then pressurized to 300–400 atm. with ethylene and rapidly heated to 200° C. during which operation the glass vial was broken. After one hour at 200° C., the shaker tube was cooled to room temperature and the excess ethylene bled off. The reactor was opened and the contents rinsed out with diethyl ether. Gas chromatographic analysis of the ether soluiton showed two components, other than ether, in a ratio of about 100 to 1. The major peak had a retention time the same as for a sample of genuine diketene. The minor component had a retention time identical to that of genuine cyclobutanone. Time-of-flight mass spectrometry gave a cracking pattern for the minor product identical to that of known cyclobutanone.

Distillate from the ether solution at room temperature under vacuum (200 mm.) contained a trace of material having a G.C. retention time identical to that of cyclobutanone. Fractionation of this ethereal distillate at atmospheric pressure gave a small residual concentrate which formed a yellow precipitate when treated with 2,4-dinitrophenylhydrazine in ethanol. The yellow solid melted over the range 95–123° C. Authentic pure 2,4-dinitrophenylhydrazone of cyclobutanone melts at 143–145° C.

The embodiments of the invention in which an exclusive property or privilege is claimed are defined as follows:

1. A process for the preparation of cyclobutanone comprising reacting monomeric ketene and ethylene at a temperature in the range of about 175–225° C., at an ethylene pressure of about 1000 atmospheres, at a mole ratio of ethylene to ketene of at least about 50:1, under substantially anhydrous conditions.

References Cited

UNITED STATES PATENTS 3,234,241   2/1966   Elam _____ 260—586 X
3,408,398   10/1968  Martin _____ 260—586

OTHER REFERENCES

Martin et al.: "J. Org. Chem.," vol. 30 (12), pp. 4175–80, 1965.

Dorer et al.: "J. Phys. Chem.," vol. 69(6), pp. 1964–72, 1965.

LEON ZITVER, Primary Examiner

N. MORGENSTERN, Assistant Examiner